United States Patent
Braunbeck et al.

(10) Patent No.: US 7,503,603 B2
(45) Date of Patent: Mar. 17, 2009

(54) MOTOR VEHICLE CHASSIS FOR A MOTOR VEHICLE

(75) Inventors: Bardo Braunbeck, Oppenheim (DE); Theobald Hock, Grossostheim (DE); Viet-Hung Nguyen, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 11/757,217

(22) Filed: Jun. 1, 2007

(65) Prior Publication Data

US 2007/0278825 A1 Dec. 6, 2007

(30) Foreign Application Priority Data

Jun. 2, 2006 (DE) .................. 10 2006 025 854

(51) Int. Cl.
*B60R 19/24* (2006.01)

(52) U.S. Cl. .................. 293/133; 293/155; 296/187.09

(58) Field of Classification Search .................. 293/132, 293/133, 155; 296/187.03, 187.09, 187.11, 296/203.01, 203.02, 204, 205, 30
See application file for complete search history.

(56) References Cited

U.S. PATENT DOCUMENTS

| 5,047,451 | A | * | 9/1991 | Barrett et al. ............... 523/442 |
| 6,712,411 | B2 | * | 3/2004 | Gotanda et al. ............. 293/155 |
| 6,802,548 | B2 | * | 10/2004 | Shimotsu ..................... 293/133 |
| 6,811,212 | B2 | * | 11/2004 | Kasuga ....................... 296/205 |
| 6,824,204 | B2 | * | 11/2004 | Gabbianelli et al. ......... 296/205 |
| 7,066,509 | B2 | * | 6/2006 | Kollaritsch et al. ......... 293/133 |
| 7,077,442 | B2 | * | 7/2006 | Arns .......................... 293/155 |
| 7,188,877 | B2 | * | 3/2007 | Gonzalez et al. ............ 293/133 |
| 7,192,067 | B2 | * | 3/2007 | Hansen ....................... 293/133 |

FOREIGN PATENT DOCUMENTS

| DE | 19612479 | 12/1997 |
| DE | 102004014073 | 10/2005 |
| DE | 102004032802 | 2/2006 |

* cited by examiner

*Primary Examiner*—Glenn Dayoan
*Assistant Examiner*—Gregory Blankenship
(74) *Attorney, Agent, or Firm*—Ingrassia Fisher & Lorenz, P.C.

(57) ABSTRACT

A motor vehicle chassis for a motor vehicle has an adapter element to join an aluminum crashbox to a longitudinal supporting beam. To accommodate one end of the crashbox the adapter element has a pot-shaped design and introduced into the longitudinal supporting beam. Due to this the motor vehicle chassis is particularly simple to construct.

10 Claims, 2 Drawing Sheets

MOTOR VEHICLE CHASSIS FOR A MOTOR VEHICLE

CROSS-REFERENCE TO RELATED APPLICATION

This Utility Patent Application claims priority to German Application No. DE 10 2006 025 854.1, filed Jun. 2, 2006.

TECHNICAL FIELD

The invention concerns a motor vehicle chassis for a motor vehicle with a tubular longitudinal supporting beam from steel and with a crashbox manufactured from light metal, whereby the crashbox is fastened at that end of the longitudinal supporting beam which faces the direction of the travel.

BACKGROUND

Such motor vehicle chassis are often used in current motor vehicles and are known in the practice. The purpose of the crashbox is to reduce the energy of the impact in the case of a frontal impact. To achieve an as low as possible weight, the crashbox is manufactured from aluminum, whereas the longitudinal supporting beam is made from steel. This causes the risk of contact corrosion between the crashbox and the longitudinal supporting beam. Therefore the crashbox, manufactured from aluminum, is usually assembled only after varnishing the steel components of the motor vehicle chassis.

At least one object of the invention is to further develop a motor vehicle chassis of the type mentioned in the introduction in such a manner, that it will prevent a contact corrosion between the crashbox and the longitudinal supporting beam as far as possible and will have a particularly low weight. Furthermore, the crashbox should be able to be introduced already into the unvarnished chassis skeleton.

SUMMARY

According to the invention this objective and other objectives are achieved by separating the crashbox and the longitudinal supporting beam with an adapter element, that the adapter element is joined with the longitudinal supporting beam and with the crashbox and that the adapter element is manufactured from steel.

By virtue of this construction and by selecting a suitable material for the adapter element, a galvanic separation of the crashbox from the longitudinal supporting beam takes place. Due to this construction, the crashbox can be manufactured from a material with a particularly low density and nonetheless prevent a contact corrosion with the longitudinal supporting beam manufactured from steel. Therefore, as a result of the invention, the assembly of the crashbox can be carried out prior to the varnishing of the longitudinal supporting beam. This contributes to the reduction of the manufacturing costs of the longitudinal supporting beam. As a result, components of the longitudinal supporting beam manufactured from steel can be cost-effectively joined by spot-welding. The adapter part, manufactured from steel, is preferably pre-fastened on the crashbox. This pre-fastening can be carried out by adhesion, riveting or bolting. Furthermore, the adapter part can be stamped, for example, in the region of a passing-through opening for transverse bolting, to produce a form-locking pre-fastening in this manner. In this case, the crashbox with the pre-fastened adapter part is pushed into the longitudinal supporting beam until the crashbox will be in its intended position relative to the longitudinal supporting beam. The joining by spot-welding of the components manufactured from steel is carried out subsequently.

According to an advantageous further development, the crashbox can be completely separated from the longitudinal supporting beam when the adapter element has a U-shaped section and when the U-shaped section is introduced into the tubular longitudinal supporting beam and when one end of the crashbox is held between the legs of the U-shaped section. By virtue of this construction, a direct contact of the longitudinal supporting beam with the crashbox is prevented by the U-shaped section of the adapter element. For this reason the longitudinal supporting beam and the crashbox can be manufactured from different materials without causing a contact corrosion between the components. Furthermore, the joint of the crashbox with the longitudinal supporting beam is particularly stable.

The end of the crashbox, which is joined with the longitudinal supporting beam, should be reliably supported in the direction of travel of the motor vehicle. The motor vehicle chassis makes a particularly reliable support of the crashbox in the direction of travel of the motor vehicle possible when the adapter element has a collar that projects away from the legs of the U-shaped section and when the collar rests on the open end of the longitudinal supporting beam.

To prevent contact corrosion, the adapter element could be manufactured, for example, from plastic material. However, according to another advantageous further development, the adapter element is very stable when the adapter element on that side which faces the crashbox has a coating from a material that is weldable with the longitudinal supporting beam. An additional task of this coating is the galvanic separation of the aluminum crashbox from the adapter part.

For the purpose of achieving an as low as possible weight, the crashboxes are often manufactured from aluminum. According to another advantageous further development, in the case of such aluminum crashboxes, a contact corrosion is particularly reliably prevented when the coating of the adapter element is organic and contains metal. Another coating would be also conceivable provided the galvanic separation between the adapter element and the aluminum crashbox is ensured and at the same time the weldability between the adapter element and the longitudinal supporting beam is ensured.

According to another advantageous development, the assembly of the adapter element would be simplified when that end of the adapter element which protrudes into the longitudinal supporting beam has lead-in bevels.

According to another advantageous development, the stability of the adapter element is further increased when the adapter element has a pot-shaped design.

It would contribute to a further increase of the stability of the motor vehicle chassis in the region of the joint of the adapter element with the adjacent components when the adapter element is joined with the longitudinal supporting beam in a material-locking manner.

According to another advantageous further development, the joining of the crashbox with the longitudinal supporting beam is particularly cost-effective when the adapter element is welded to the longitudinal supporting beam. By doing so, the crashbox can be inserted into the chassis skeleton in an automatic welding station, while a supporting bolted joint can be made later manually or automatically during the final assembly.

It can contribute to a further increase of the stability of the joint of the crashbox on the longitudinal supporting beam, when according to another advantageous further development, at least one holding bolt passes through the crashbox, the adapter element and the longitudinal supporting beam transversely to the direction of travel. This holding bolt forms the supporting joint and can be provided in addition to the material-locking joint of the adapter element with the crashbox and the longitudinal supporting beam, so that to produce the intended stability of the motor vehicle chassis. The welding between the longitudinal supporting beam and the adapter element serves mainly the purpose of pre-fastening and aligning in the chassis skeleton and also contributes to the stability and to the lasting alignment of the crashbox with the longitudinal supporting beam.

A further advantageous design of the crashbox is that the adapter element is constructed from several parts.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description of the invention.

Figure 1:
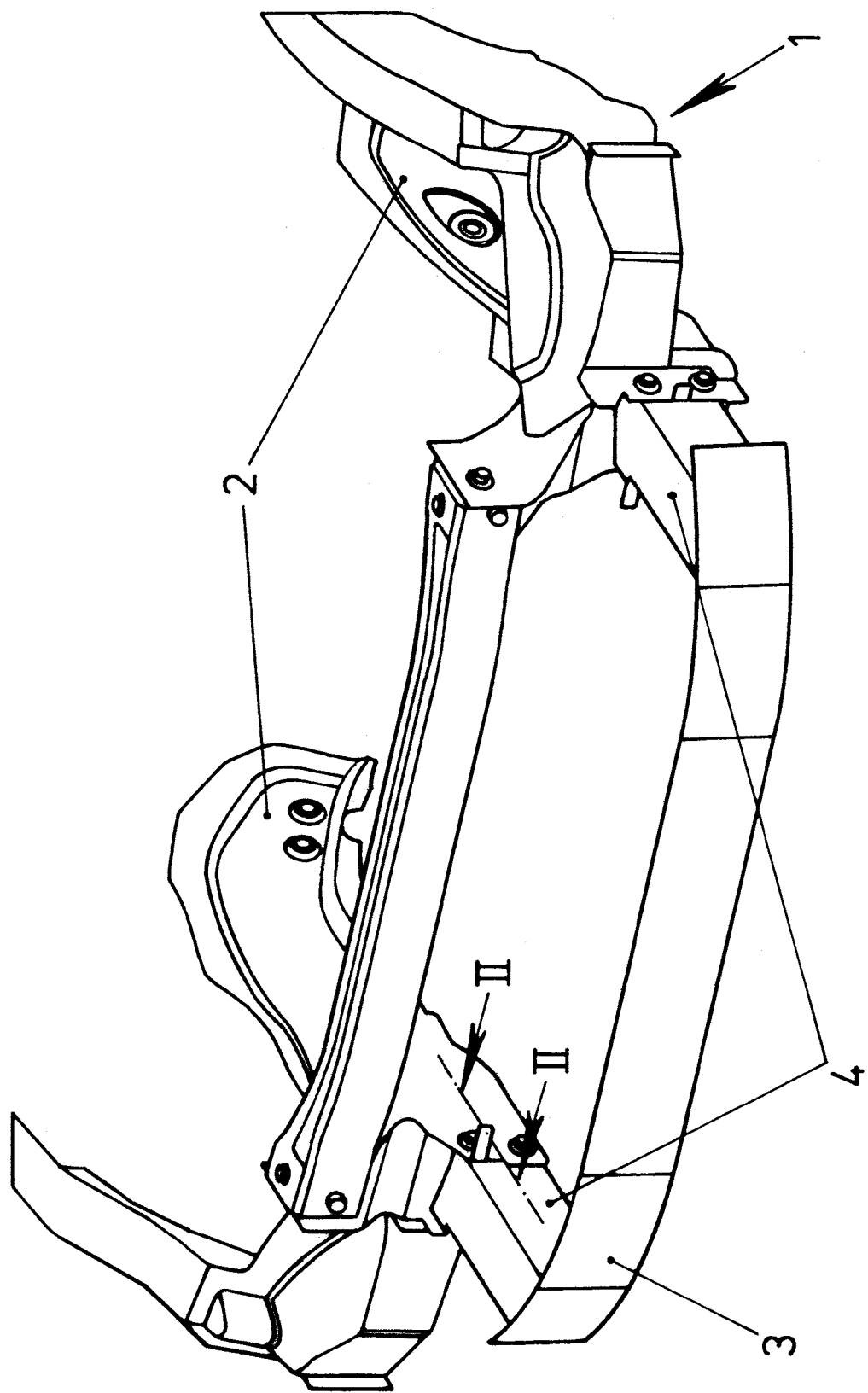
FIG. 1 is the perspective illustration of a portion of the motor vehicle chassis according to an embodiment, facing the direction of travel.

FIG. 1 is a perspective illustration of a portion of a motor vehicle chassis 1 of a motor vehicle, facing the direction of travel, with longitudinal supporting beams 2 and with a bumper bar carrier 3. Between the bumper bar carrier 3 and the longitudinal supporting beams 2 crashboxes 4 are provided. The longitudinal supporting beams 2 are manufactured from steel and the crashboxes 4 from light metal, aluminum, for example.

Figure 2:
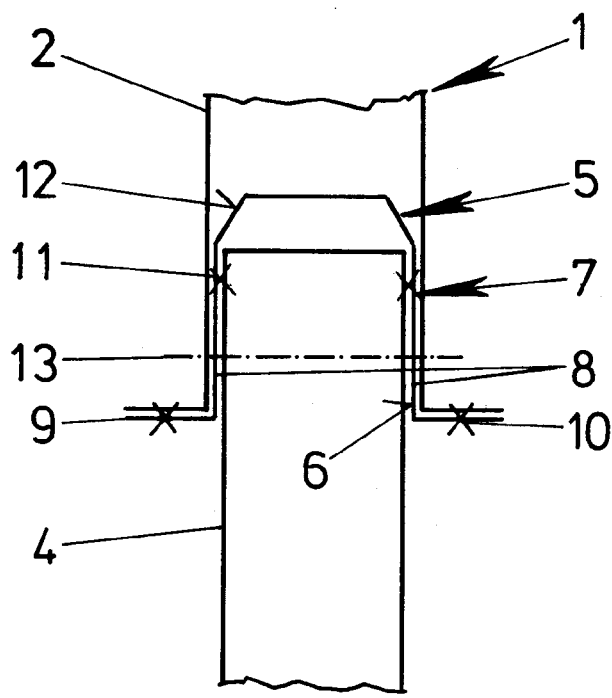
FIG. 2 illustrates a section through a portion of the motor vehicle chassis, along line II-II of FIG. 1.

FIG. 2 shows a section of the motor vehicle chassis 1 along the line II-II of FIG. 1 in the region of the joint of a crashbox 4 to one of the longitudinal supporting beams 2. That end of the crashbox 4 which faces away from the bumper bar carrier 3 is inserted into the longitudinal supporting beam 2. For this purpose the longitudinal supporting beam 2 has a tubular shape. Between the longitudinal supporting beam 2 and the crashbox 4 an adapter element 5 is provided. The adapter element 5 is manufactured from steel and at that side which faces the crashbox 4 it has an organic and metal-containing, weldable coating 6. The properties of the organic coating 6 are intended for the welding with the longitudinal supporting beam 2. In the section illustrated, the adapter element 5 has a U-shaped section 7, with which it surrounds the end of the crashbox 4 protruding into the longitudinal supporting beam 2. The legs 8 of the U-shaped section 7 separate the crashbox 4 from the longitudinal supporting beam 2. On the free ends of the legs 8 the adapter element 5 has projecting collars 9, with which it rests on the free end of the longitudinal supporting beam 2. The collars 9 are joined with the longitudinal supporting beam 2 by spot-welds 10. The crashbox 4 has also fastening points 11 with the adapter element 5. The fastening points 11 can be produced by riveting, clinching, bolting, adhesion or stamping. Furthermore, the adapter element 5 has lead-in bevels 12 at that end which protrudes into the longitudinal supporting beam 2. At least one holding bolt 13 passes through the longitudinal supporting beam 2, the adapter element 5 and the crashbox 4 transversely to the intended direction of travel of the motor vehicle.

Figure 3:
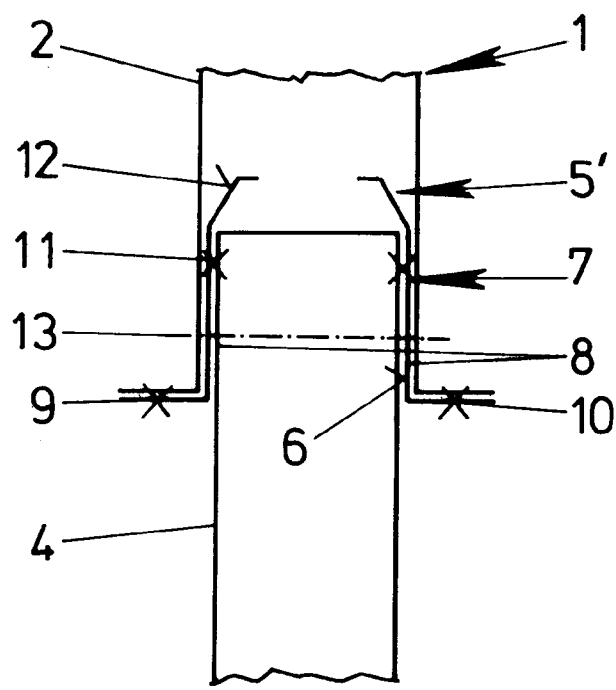
FIG. 3 illustrates a section through a further embodiment of the portion of the motor vehicle chassis, illustrated in FIG. 2.

FIG. 3 shows a section through a further embodiment of the portion of the motor vehicle chassis 1, that differs from that of FIG. 2 only by that an adapter element 5' is constructed from several parts. Thus the legs 8 of the adapter element 5' are not joined with one another.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle chassis for a motor vehicle with a tubular longitudinal supporting beam formed from steel and with a crashbox manufactured from light metal, whereby the crashbox is fastened at an end of the longitudinal supporting beam which faces the direction of the travel, wherein the crashbox and the longitudinal supporting beam are separated by an adapter element, and that the adapter element is joined with the longitudinal supporting beam and with the crashbox and that the adapter element is manufactured from steel, wherein at least one holding bolt passes through the crashbox, the adapter element, and the longitudinal supporting beam transversely to the direction of travel.

2. A motor vehicle chassis according to claim 1, wherein the adapter element has a U-shaped section and the U-shaped section is introduced into the tubular longitudinal supporting beam and the one end of the crashbox is held between the legs of the U-shaped section.

3. A motor vehicle chassis according to claim 2, wherein the adapter element has a collar that projects away from the legs of the U-shaped section and the collar rests on the open end of the longitudinal supporting beam.

4. A motor vehicle chassis according to claim 1, wherein the adapter element on that side which faces the crashbox has a coating from a material that is weldable with the longitudinal supporting beam.

5. A motor vehicle chassis according to claim 4, wherein the coating of the adapter element is organic and contains metal.

6. A motor vehicle chassis according to claim 1, wherein the end of the adapter element which protrudes into the longitudinal supporting beam has lead-in bevels.

7. A motor vehicle chassis according to claim 1, wherein the adapter element has a pot-shaped design.

8. A motor vehicle chassis according to claim 1, wherein the adapter element is joined with the longitudinal supporting beam in a material-locking manner.

9. A motor vehicle chassis according to claim 8, wherein the adapter element is welded to the longitudinal supporting beam.

10. A motor vehicle chassis according to claim 1, wherein the adapter element is constructed from several parts.

* * * * *